United States Patent
Peterson et al.

(10) Patent No.: US 10,298,769 B2
(45) Date of Patent: May 21, 2019

(54) CALL TRANSFER BETWEEN DEVICES

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); Arnold S. Weksler, Raleigh, NC (US); John Carl Mese, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/217,539

(22) Filed: Jul. 22, 2016

(65) Prior Publication Data
US 2018/0027120 A1    Jan. 25, 2018

(51) Int. Cl.
| | |
|---|---|
| H04M 3/42 | (2006.01) |
| H04M 3/54 | (2006.01) |
| H04M 3/58 | (2006.01) |
| H04M 1/725 | (2006.01) |
| H04M 7/00 | (2006.01) |

(52) U.S. Cl.
CPC ......... H04M 3/543 (2013.01); H04M 1/7258 (2013.01); H04M 1/72569 (2013.01); H04M 3/58 (2013.01); H04M 7/0027 (2013.01); H04M 2203/1008 (2013.01)

(58) Field of Classification Search
CPC ........ H04M 1/72; H04M 1/7253; H04M 3/54; H04M 3/541; H04M 3/543; H04M 3/545; H04M 3/546; H04M 3/548; H04M 9/00; H04M 9/001; H04M 15/93; H04M 2215/32; H04M 2250/02; H04M 2250/04; H04M 2250/06

USPC ............ 379/201.01, 211.01, 211.02, 211.03, 379/211.04, 211.05, 212.01
See application file for complete search history.

(56) References Cited

U.S. PATENT DOCUMENTS

| | | | | |
|---|---|---|---|---|
| 6,724,755 | B1* | 4/2004 | Kim .................... | H04M 1/6505 370/352 |
| 8,442,196 | B1* | 5/2013 | Shaffer ............... | H04L 12/1813 379/202.01 |
| 9,369,855 | B2* | 6/2016 | Lovitt .................... | H04M 3/56 |
| 9,438,739 | B2* | 9/2016 | Mairs ................ | H04M 3/42263 |
| 2007/0189217 | A1* | 8/2007 | Wang ................ | H04L 29/06027 370/331 |
| 2011/0122864 | A1* | 5/2011 | Cherifi .................... | H04M 3/58 370/352 |
| 2011/0237230 | A1* | 9/2011 | Li ..................... | H04M 1/72513 455/414.1 |
| 2012/0278727 | A1* | 11/2012 | Ananthakrishnan ........................ | G06F 3/0486 715/748 |

(Continued)

OTHER PUBLICATIONS

"Use the Dash as a Bluetooth Headset", Bragi Support. Available at: https://support.bragi.com/hc/en-us/articles/203178571-Use-The-Dash-as-a-Bluetooth-headset. Last accessed on Jul. 20, 2016.

*Primary Examiner* — Khai N. Nguyen
(74) *Attorney, Agent, or Firm* — Ference & Associates LLC

(57) ABSTRACT

One embodiment provides a method, including: employing a first device for a call; automatically detecting a transfer requirement between the first device and a second device; and transferring, from the first device to the second device, the call in response to the detecting. Other aspects are described and claimed.

20 Claims, 4 Drawing Sheets

(56) References Cited

U.S. PATENT DOCUMENTS

| | | | | |
|---|---|---|---|---|
| 2014/0365904 A1* | 12/2014 | Kim | ................. | G06F 3/0484 |
| | | | | 715/741 |
| 2014/0369483 A1* | 12/2014 | Lovitt | ................. | H04M 3/56 |
| | | | | 379/202.01 |
| 2014/0369484 A1* | 12/2014 | Mairs | ................. | H04M 3/42263 |
| | | | | 379/212.01 |
| 2015/0134753 A1* | 5/2015 | Shin | ................. | H04L 51/14 |
| | | | | 709/206 |
| 2015/0208287 A1* | 7/2015 | Sylvain | ................. | H04W 36/26 |
| | | | | 370/333 |
| 2015/0236843 A1* | 8/2015 | Johnson | ................. | H04L 5/16 |
| | | | | 370/296 |
| 2015/0296355 A1* | 10/2015 | Lovitt | ................. | H04M 3/56 |
| | | | | 455/416 |
| 2016/0029189 A1* | 1/2016 | Michael | ................. | H04W 4/16 |
| | | | | 455/417 |
| 2016/0259425 A1* | 9/2016 | Lovitt | ................. | H04M 3/56 |
| 2017/0149850 A1* | 5/2017 | Lam | ................. | H04L 65/1096 |

* cited by examiner

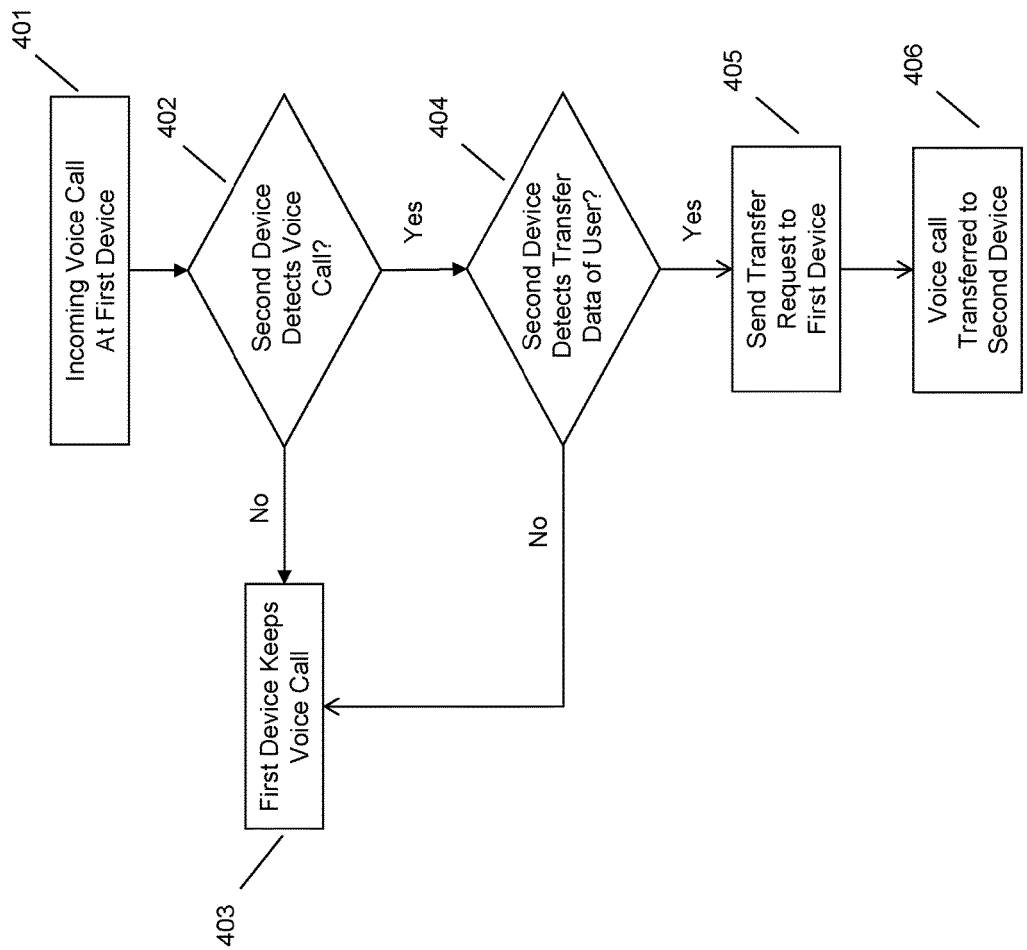

CALL TRANSFER BETWEEN DEVICES

BACKGROUND

As devices other than traditional telephones come into more frequent use for calls, e.g., voice or video calls, users have more options with respect to which device is utilized for making and receiving calls. For example, in addition to mobile/cellular phones and smart phones, other devices such as desktop computers, laptop computers, and tablets are now being utilized for calls because these devices support call functionality, typically via a voice over IP (VoIP) mechanism that routes call data through the Internet.

Some services permit a user to predetermine which device is to be used for calls. For example, a service exists that automatically forwards phone calls, e.g., from a desk phone to a mobile phone. Thus, a user might choose to have his or her mobile device ring if a phone call is directed to his or her desk. Similarly, a user may pre-select which devices should ring on receipt of a call by any of the devices. This offers the user the option to pick up the call using any of the devices.

Further, a user may manually transfer a call from one device to another. For example, a user may pick up a call at one device, e.g., a standard desk phone, and transfer that call to another device, e.g., a mobile phone. This is commonly accomplished by accepting the call at the first device, placing the call on hold at the first device, and dialing a new number (i.e., of the device chosen) in order to transfer the call.

BRIEF SUMMARY

In summary, one aspect provides a method, comprising: employing a first device for a call; automatically detecting a transfer requirement between the first device and a second device; and transferring, from the first device to the second device, the call in response to the detecting.

Another aspect provides a method, comprising: receiving, at a second device, an indication of a call; thereafter detecting, at the second device, data indicating that the call is to be transferred from a first device to the second device; sending, from the second device to the first device, data that transfers the call; and receiving, at the second device, the call that has been transferred.

A further aspect provides an electronic device, comprising: a communication device that connects the electronic device to a network; a processor operatively coupled to the communication device; and a memory device that stores instructions executable by the processor to: detect a call; automatically detect a transfer requirement between the electronic device and a second device; and transfer, from the electronic device to the second device, the call in response to the transfer requirement.

A still further aspect provides an electronic device, comprising: an accelerometer; an input device that detects user inputs; a communication device that connects the electronic device to a network; a processor operatively coupled to the accelerometer, the communication device and the input device; and a memory device that stores instructions executable by the processor to: receive, at the electronic device, an indication of a call; thereafter detect, at the electronic device, data indicating that the call is to be transferred from the first device to the electronic device; send, from the electronic device to the first device, data that transfers the call; and receive, at the electronic device, the call that has been transferred.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 and FIG. 4 illustrate an example method of coordinating a call transfer between devices.

DETAILED DESCRIPTION

Figure 1:
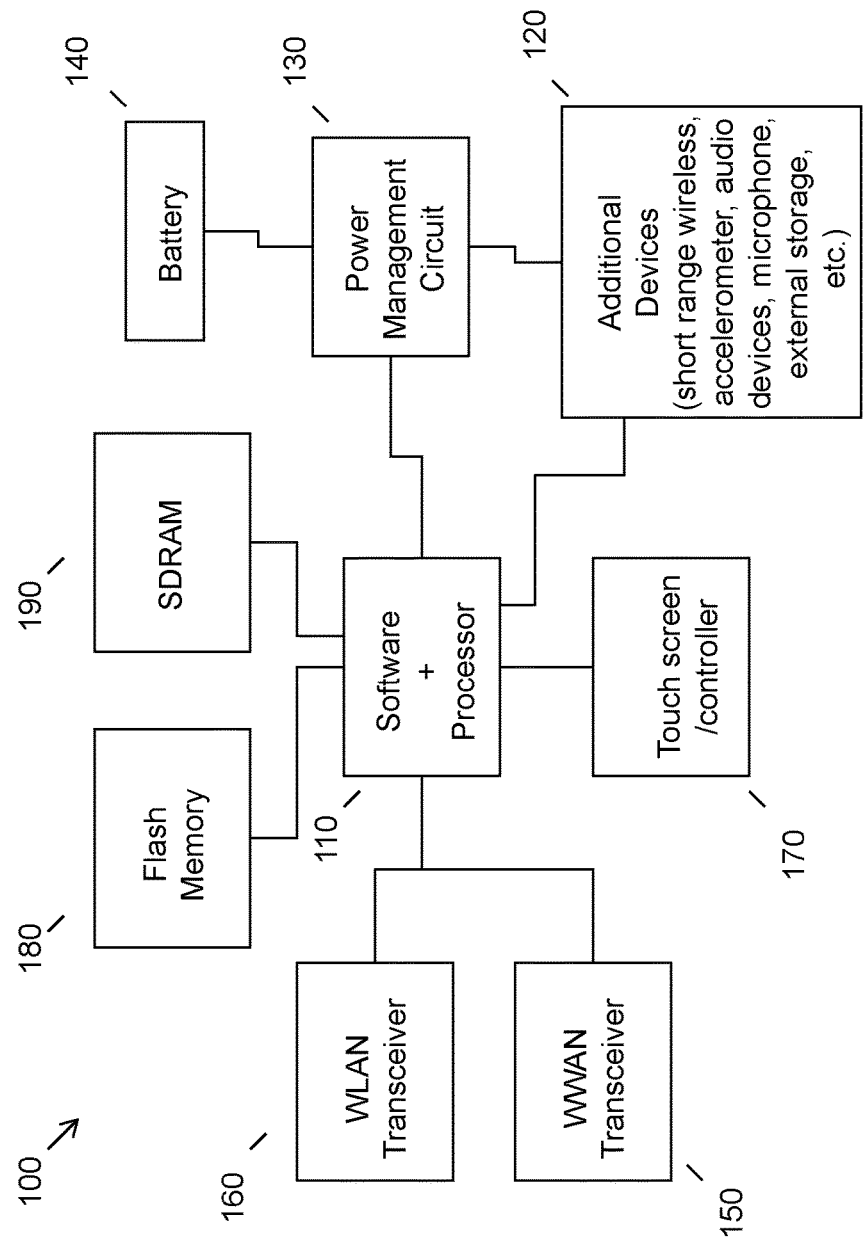
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

It is difficult to transfer live calls between devices. Many times a user might take a call at an office or work phone and realize that the nature of the call might be personal and want to get up and walk to a private area. If the user received the call on a standard desk phone, he or she might need to tell the person they will call them right back to continue the conversation from a mobile phone. While services exist that allow a phone number to ring multiple devices at once when a call is coming in, this can be cumbersome in always having multiple phones ring, and in any event would require the user to know in advance that a call might need to be taken elsewhere.

With as many phone devices that are moving to VoIP services implemented on smart devices, it is possible to get more functionality out of a phone system. Many office desk phones are now implemented as applications running on the user's desktop or laptop computer. For example, VoIP phones can be installed as an application running on a desktop or laptop computer as well as on a smart phone or a tablet computing device.

Accordingly, an embodiment utilizes software phone applications, e.g., VoIP applications running on a user's devices, to receive a call, e.g., voice or video call, on one device and easily move or transfer that call to another device. For example, if a user receives a call on a desktop phone application, an embodiment permits the user to get up, and without manually inputting data to transfer the call, transfer the call to a mobile device running the same or a similar phone application. Based on the fact that the phone application is installed on both devices, the devices can coordinate the receiving of the call in an intuitive way. In an embodiment, the transfer may occur before or after the call is picked up or accepted at the first device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a microphone for receiving voice commands, a camera for receiving image data including gestures, an accelerometer for detecting device motion, etc. System 100 often includes a touch screen 170 for data input and display/rendering. System 100 also typically includes various memory devices, for example flash memory 180 and SDRAM 190.

Figure 2:
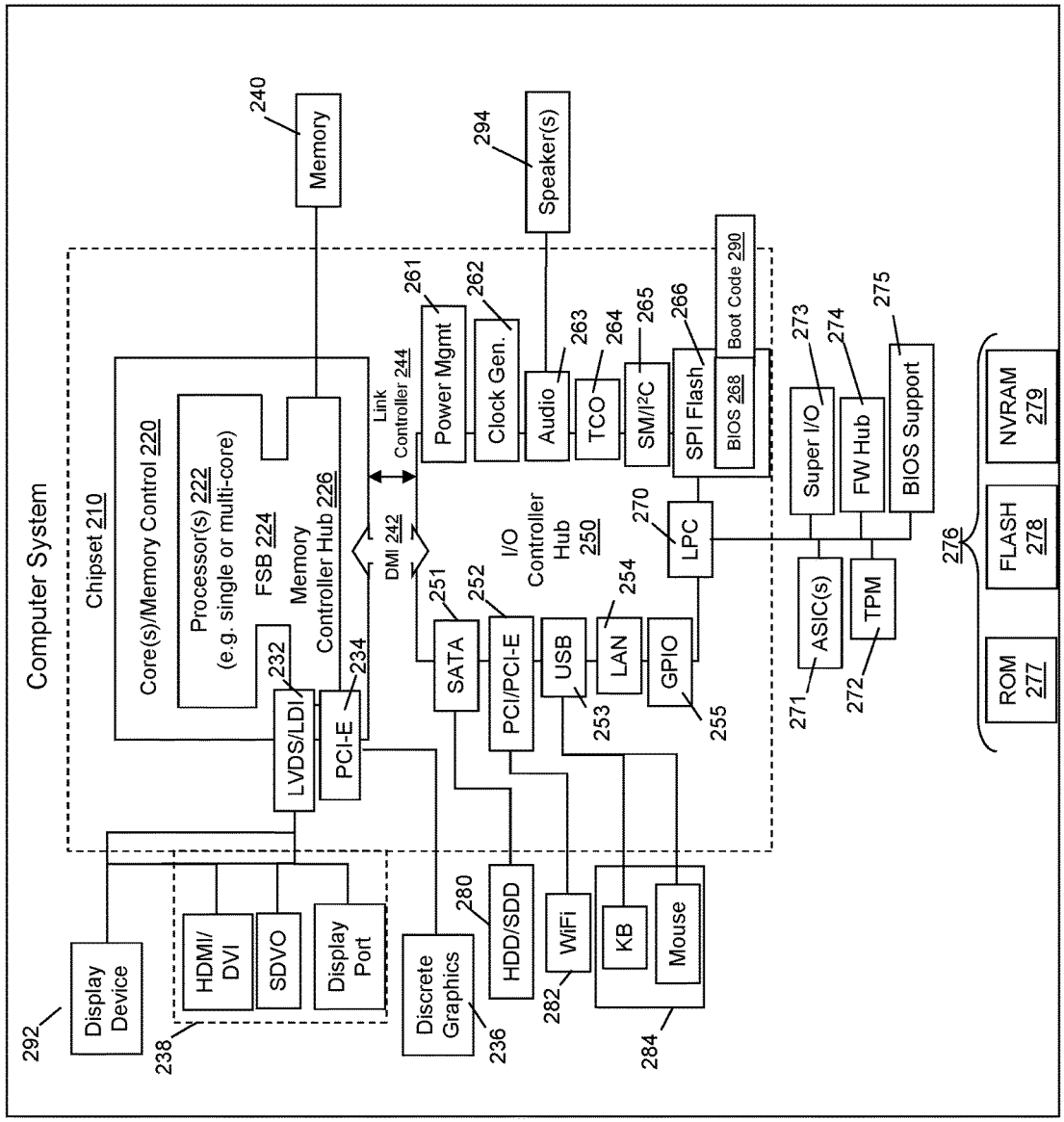
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, desktop and laptop computing devices, or any device that supports call functionality. Throughout the remainder of this description, each such device is referred to as a device or electronic device for simplicity. Furthermore, throughout the remainder of this description, a call is referred to as a voice call for simplicity. It will be readily apparent that each device may include circuitry that supports the functionality described, which may include some or all of the circuitry outlined by way of example in FIG. 1 and FIG. 2 for supporting voice or video call functionality.

Figure 3:
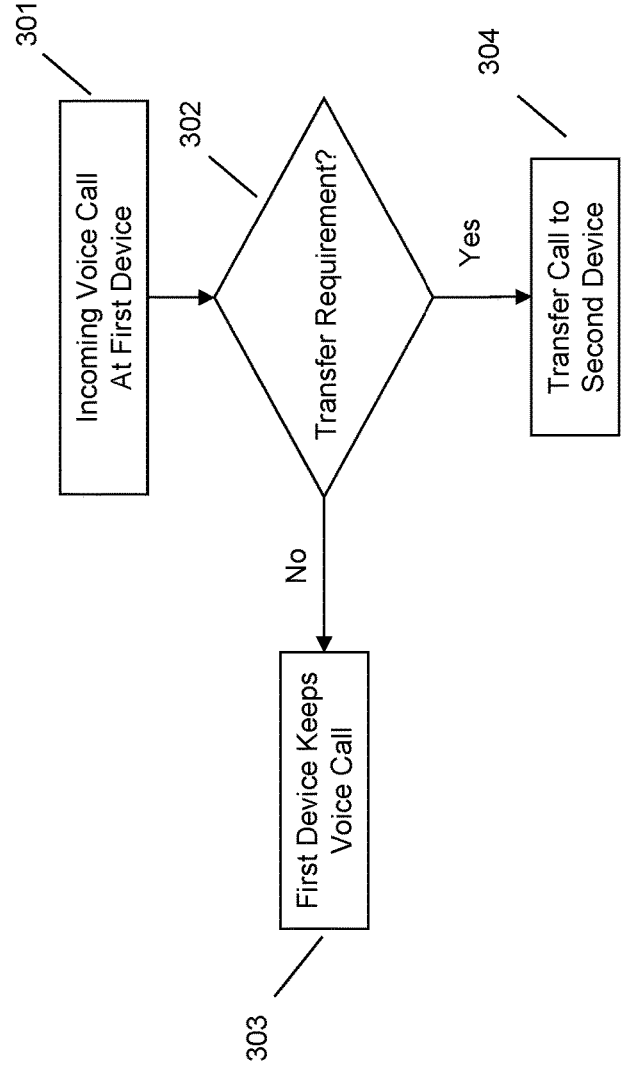

FIGS. 3-4 outline an example of coordinating call transfer between devices. FIG. 3 specifically is directed to a first device's perspective, e.g., a laptop or desktop computer that runs a software phone application. FIG. 4 specifically is directed to a second device's perspective, e.g., a tablet or smart phone that runs a like software phone application, where each devices' software phone application communicates with the other as described.

In each of FIG. 3 and FIG. 4, it should be understood that the functions performed by the first device and the second device may be switched, or a function preformed by the first device or the second device may be performed by both devices, e.g., in cooperation, or may be performed by another device.

Referring first to the example outlined in FIG. 3, if a first device is employed in a voice call, e.g., if a voice call is received at a first device at 301, a user may wish to answer the voice call, or at some point transfer the voice call, to another device, e.g., a second device such as a smart phone or tablet. Thus, an embodiment determines if a transfer requirement exists, e.g., data that dictates that the device currently handling the voice call should transfer the voice call to another device. For example, illustrated at 302, a determination may be made as to whether a second device has requested that the voice call be transferred to the second device. In an embodiment, the software phone application running on the first device, such as a laptop computing device, may detect a transfer request communicated by the software phone application running on the second device, such as a smart phone. Examples of the origin and nature of transfer requests will be further described herein.

Irrespective of the cause of the transfer requirement that is detected, if such transfer requirement is detected at 302, an embodiment transfers the voice call to the second device at 304. Otherwise, the voice call remains at the first device, as illustrated at 303.

The transfer of the voice call at 304 may be initiated or completed prior to the user answering the voice call, e.g., at the first device. For example, if a user receives a voice call at an office phone implemented in software at a laptop computing device, and the user recognizes that number is for a personal conversation (e.g., the call is from a doctor's office), the user may wish to transfer the voice call to the second device prior to accepting the voice call at the first device, i.e., while the call is ringing at the first device.

Consequently, referring to FIG. 4, the software phone application running on the user's first device (e.g., laptop computing device) and the user's second device (e.g., smart phone) may be logged into a phone service associated with the user, with each of the user's devices using the same account information. The phone service may be implemented or managed by a remote device, e.g., a remote server or could service.

As such, the second device, specifically in this example the software phone application running on the smart phone, may be informed of the receipt of the phone call at the first device (in this example, the user's laptop computing device), as illustrated at 401. For example, this information or data indicating that the user's first device has received a voice call may be communicated to the second device by a cloud service or remote server, which sends the data to the user's second device, specifically the user's software phone application running on the user's smart phone in this example, indicating that another of the user's devices, in this case the user's laptop computing device, has received a voice call.

If the second device, in this case the user's smart phone, detects that a voice call is pending or has been received at another of the user's devices, as illustrated at 402, the software phone application running on the user's smart phone additionally may recognize a user action, at illustrated at 404. For example, the user action may be indicative of a case where the user wishes to accept the incoming call at the second device or transfer an ongoing call to the second device. Alternatively or in addition, the first device may detect the transfer requirement.

The action detected at 404 may take a variety of forms, including but not necessarily limited to a click of a soft button on the smart phone's touch screen, detection that the smart phone is moving or moving in a particular way (e.g., moving away from the laptop computing device, moving towards the user's face, moving in a predetermined pattern, etc.). If no such action is detected on the part of the user, the first device may retain the voice call without transferring the voice call to the second device, as illustrated at 403.

However, if such an event is detected, the software phone application running on the user's second device may therefore send a request to the first device, as illustrated at 405. Particularly, a transfer request may be send from the software phone application running on the smart phone to the software phone application running on the laptop computing device in this example, i.e., data requesting that the voice call be transferred to the user's smart phone, specifically to the user's software phone application running on the smart phone. Accordingly, the first device may transfer the voice call to the second device, as illustrated at 406.

As described herein, the transfer of the voice call between the first and the second device may be implemented at various times. In the above example, the voice call may be transferred to the second device prior to the call being accepted by the first device, i.e., responsive to the transfer request issued by the second device. However, the call may be transferred to the second device after the call has been received and accepted at the first device.

By way of example, if a user has already answered a voice call on a laptop computing device but then realizes that he or she needs or wants to transfer the voice call to a mobile phone, the user may simply supply an action indicating as much, which in turn issues a transfer request. The transfer request may take the form of a message or signal the triggers execution of a transfer program. The data triggering the transfer request may be received at the second device, at the first device, or a combination of the foregoing.

The transfer program may comprise an automated algorithm for transferring a voice call to another phone line. For example, a transfer request may be communicated at 405 by short range wireless communication directly between a wireless radio of the smart phone and the laptop computing device, where the wireless communication is forwarded to the software phone application running on the laptop computing device. The software phone running on the laptop computing device in turn may be programmed to respond to this communication by automatically placing the voice call on hold, establishing a new connection to the second device, and completing the transfer of the voice call to the second device using the second device's phone number. The second device (and pertinent data, e.g., its phone number) may be identified ahead of time, or, the wireless communication may identify the destination/phone number of the second device.

It will be appreciated that the transfer request may be sent at 405 using another communication or data link between the first device and the second device. By way of example, the second device may send the transfer request through a network such as the Internet to the first device. In an embodiment, this may be facilitated or managed by a remote server or cloud service.

The action that causes a transfer request to be issued at 405 may take a variety of forms. For example, a user may simply get up and start walking away from the laptop computing device while carrying the smart phone, e.g., while the voice call is ringing at the laptop computing device. This predetermined movement data, detected by the second device in a relevant time window, may cause the second device to issue the request at 405 for the voice call to be transferred. Other actions that cause a transfer request to be issued at 405 may include a user providing predetermined motion to the second device (e.g., shaking), the user performing a predetermined gesture detectable by the second device, the user providing a predetermined voice command, etc. Likewise, if a user moves the smart phone proximate to or to touch his or her face, movement data and/or proximity sensing data may be used to determine that a transfer request should be issued at 405.

The second device may issue a prompt (e.g., displayed on the touch screen of the smart phone) in response to the action, e.g., as the user moves away from the laptop computing device. The user may respond to the prompt, e.g., using touch input, voice input, gesture input, or a continued movement, to confirm that a transfer request should be issued.

Therefore, an embodiment permits a voice call to be transferred between devices using an intuitive mechanism. In an embodiment, the functionality is implemented at least in part by software phone applications running on the user's devices. These software phone applications may communicate with one another to intelligently select which device should handle the voice call. In an embodiment, the transfer of the voice call includes activing a new voice data link using a telephone number of the second device, and transferring the live or pending voice call to that new number.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    employing a first device for a call, wherein the first device comprises a first software phone application associated with a user account and managed by a remote device;
    automatically detecting a transfer requirement between the first device and a second device, wherein the second device comprises a second software phone application associated with the first software phone application and associated with the user account, wherein the second device is informed of the call of the first device by the remote device via the second software phone application, wherein the automatically detecting comprises detecting the transfer requirement at one of: the first software phone application and the second software phone application; and transferring, from the first device to the second device and without receiving manual user input to transfer the call, the call in response to the detecting by sending a transfer request between the first software phone application and the second software phone application.

2. The method of claim 1, wherein the transferring occurs prior to the call being accepted at the first device.

3. The method of claim 1, wherein the transferring comprises transferring the call from a first telephone number of the first device to a second telephone number of the second device.

4. The method of claim 1, wherein the transfer requirement is a request and wherein the request is initiated at the second device.

5. The method of claim 4, wherein the request from the second device is received over a wireless connection.

6. The method of claim 4, wherein the request from the second device is received over an Internet connection.

7. A method, comprising:
receiving, at a second device, an indication of a call, wherein the second device comprises a first software phone application associated with a user account and managed by a remote device;

thereafter detecting, at the second device, data indicating that the call is to be transferred from a first device to the second device, wherein the first device comprises a second software phone application associated with the first software phone application and associated with the user account, wherein the second device is informed of the call of the first device by the remote device via the second software phone application, wherein the automatically detecting comprises detecting the transfer requirement at one of: the first software phone application and the second software phone application;

sending, from the second device to the first device, data that transfers the call, wherein the sending data comprises sending a transfer request from the first software phone application to the second software phone application, wherein the transfer request is not in response to receiving manual user input to transfer the call; and receiving, at the second device, the call that has been transferred.

8. The method of claim 7, wherein the detecting comprises detecting movement of the second device.

9. The method of claim 7, wherein the detecting comprises detecting user input at the second device.

10. The method of claim 9, wherein the user input is selected from the group consisting of a user gesture input, a touch input, and a voice input.

11. An electronic device, comprising:
a communication device that connects the electronic device to a network, wherein the electronic device comprises a first software phone application associated with a user account and managed by a remote device;

a processor operatively coupled to the communication device; and a memory device that stores instructions executable by the processor to:
detect a call;
automatically detect a transfer requirement between the electronic device and a second device, wherein the second device comprises a second software phone application associated with the first software phone application and associated with the user account, wherein the second device is informed of the call of the first device by the remote device via the second software phone application, wherein the automatically detecting comprises detecting the transfer requirement at one of: the first software phone application and the second software phone application; and transfer, from the electronic device to the second device and without receiving manual user input to transfer the call, the call in response to the transfer requirement by sending a transfer request between the first software phone application and the second software phone application.

12. The electronic device of claim 11, wherein the call is transferred to the second device prior to the call being accepted at the electronic device.

13. The electronic device of claim 11, wherein the call is transferred from a first telephone number of the electronic device to a second telephone number of the second device.

14. The electronic device of claim 11, wherein the transfer requirement is a request and wherein the request is initiated at the second device.

15. The electronic device of claim 14, wherein the request from the second device is received over a wireless connection.

16. The electronic device of claim 14, wherein the request from the second device is received over an Internet connection.

17. An electronic device, comprising:
an input device that detects user inputs;
a communication device that connects the electronic device to a network;
a processor operatively coupled to the communication device and the input device; and
a memory device that stores instructions executable by the processor to:
receive, at the electronic device, an indication of a call, wherein the electronic device comprises a first software phone application associated with a user account and managed by a remote device;

thereafter detect, at the electronic device, data indicating that the call is to be transferred from a first device to the electronic device, wherein the first device comprises a second software phone application associated with the first software phone application and associated with the user account, wherein the second device is informed of the call of the first device by the remote device via the second software phone application, wherein the automatically detecting comprises detecting the transfer requirement at the first software phone application;

send, from the electronic device to the first device, data that transfers the call by sending a transfer request from the first software phone application to the second software phone application, wherein the transfer request is not in response to receiving manual user input to transfer the call; and receive, at the electronic device, the call that has been transferred.

18. The electronic device of claim 17, further comprising an accelerometer and wherein the data comprises movement data generated by the accelerometer in response to movement of the electronic device.

19. The electronic device of claim 17, wherein the data comprises user input data received at the electronic device.

20. The electronic device of claim 19, wherein the user input data is selected from the group consisting of a user gesture input data detected by the input device, touch input detected by the input device, and voice input data detected by the input device.

\* \* \* \* \*